United States Patent [19]
Burgess et al.

[11] Patent Number: 5,868,516
[45] Date of Patent: Feb. 9, 1999

[54] MOUNTING ASSEMBLY FOR MOUNTING A SAW HEAD TO A TRACTOR

[75] Inventors: Michael Keith Burgess; Lawrence Dennis Kilpo, both of Duluth, Minn.

[73] Assignee: Pettibone Corporation, Lisle, Ill.

[21] Appl. No.: 797,156

[22] Filed: Feb. 10, 1997

[51] Int. Cl.⁶ .................................................. F16B 1/00
[52] U.S. Cl. ............................ 403/335; 403/3; 403/199; 144/34.1; 144/34.5; 144/4.1
[58] Field of Search ................................. 403/335, 337, 403/11, 3, 4, 167, 168, 187, 199, 84, 87, 103; 414/912; 172/247; 144/34.1, 34.5, 4.1, 336, 335, 343

[56] References Cited

U.S. PATENT DOCUMENTS

| | | | |
|---|---|---|---|
| 3,517,491 | 6/1970 | Lausch et al. . | |
| 3,528,685 | 9/1970 | Eastman . | |
| 3,823,753 | 7/1974 | Moser . | |
| 3,927,704 | 12/1975 | Wirt | 144/34.5 |
| 3,970,125 | 7/1976 | Muirhead et al. . | |
| 3,996,981 | 12/1976 | Bruun . | |
| 4,171,172 | 10/1979 | Johnston | 403/167 X |
| 4,210,183 | 7/1980 | Nilsen | 144/34.5 X |
| 4,253,793 | 3/1981 | Braml . | |
| 4,369,590 | 1/1983 | Miller | 172/247 X |
| 4,446,897 | 5/1984 | Kurelek . | |
| 4,565,486 | 1/1986 | Crawford et al. | 144/4.1 X |
| 4,679,604 | 7/1987 | Howeth | 144/34.1 |
| 4,793,389 | 12/1988 | Sigouin et al. . | |
| 4,850,409 | 7/1989 | Roberson . | |
| 4,951,990 | 8/1990 | Hollan et al. | 414/912 X |
| 5,010,962 | 4/1991 | Bloom, Jr. . | |
| 5,355,920 | 10/1994 | Tanguay | 144/4.1 X |
| 5,390,715 | 2/1995 | Luscombe | 144/343 X |
| 5,501,257 | 3/1996 | Hickman . | |
| 5,575,093 | 11/1996 | Pratt et al. | 403/335 X |

*Primary Examiner*—Harry C. Kim
*Attorney, Agent, or Firm*—McDermott, Will and Emery

[57] ABSTRACT

A bolt-on mounting assembly for mounting a saw head having a base member and a generally vertical member extending from the base member to a tractor having first and second lift arms comprising a mounting lug, structure for securing the mounting lug to the saw head, structure for receiving the first lift arm of said tractor, and structure for securing the first lift arm to said structure for receiving the first lift arm.

5 Claims, 4 Drawing Sheets

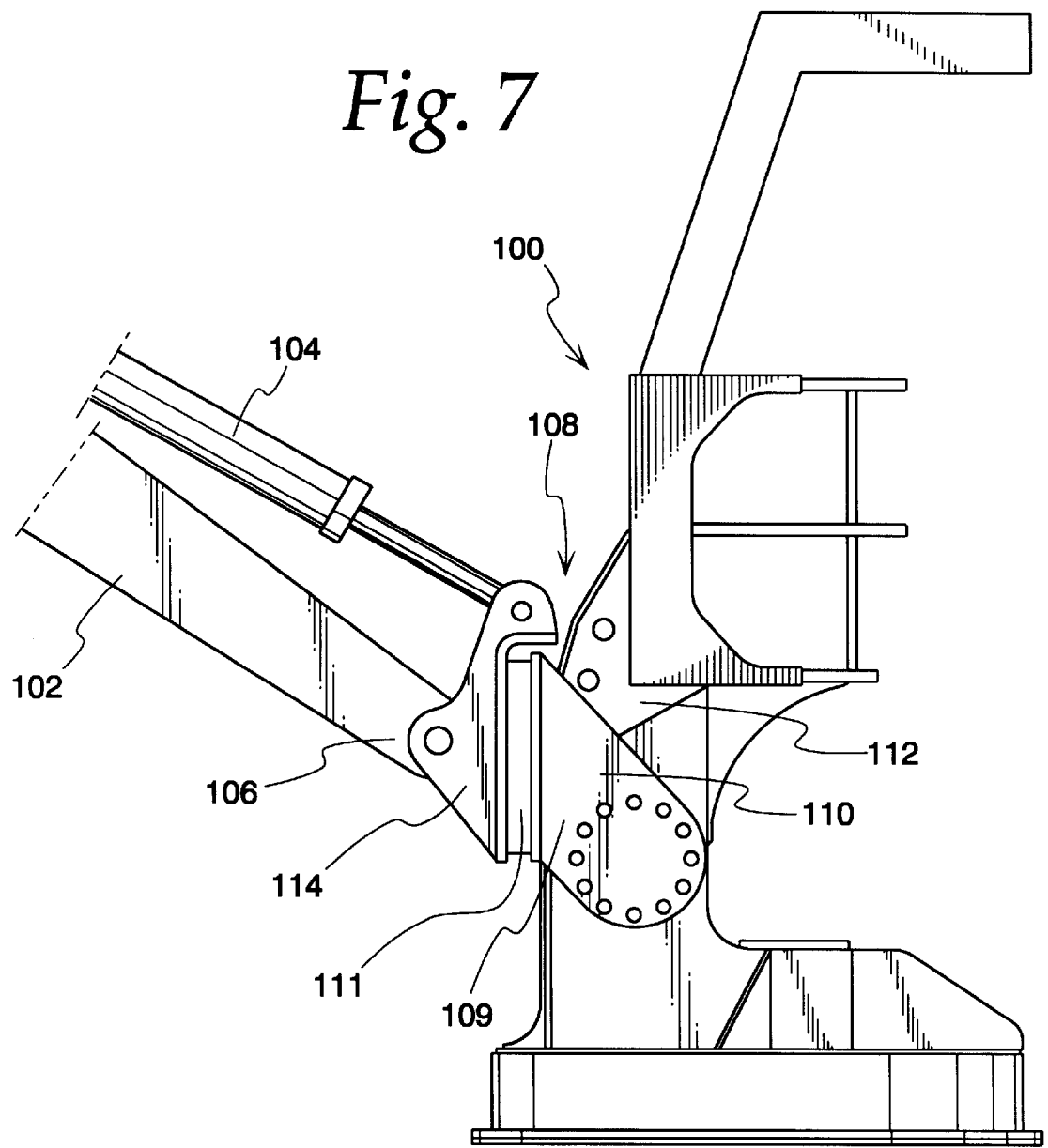

5,868,516

MOUNTING ASSEMBLY FOR MOUNTING A SAW HEAD TO A TRACTOR

BACKGROUND OF THE INVENTION

1. Field of the Invention

This invention relates generally to an adjustable mounting assembly for mounting a saw head to a tractor. The adjustable mounting assembly allows the saw head to be easily mounted to several different types of tractors and allows the saw head to be mounted to a particular tractor in a number of different initial positions.

2. Background Art

Saw heads containing circular saw blades for cutting down trees are mounted on the front end of tractors, e.g., rubber tire feller bunchers and crawler type feller bunchers. The saw heads have mounting brackets welded onto a base of the saw head.

Attached to the front of the rubber tired feller buncher are right and left lift arms and a central link member. The orientation of the distal ends of the lift arms and link member dictates the size and placement of the mounting brackets on the saw head. The relative position of the distal ends of the lift arms and the distal end of the central link member are different for each manufacturer's tractor.

To mount a saw head to the tractor, the distal end of each of the boom or lift arms is placed between and secured to the mounting brackets and a distal end of the central link member is placed between and secured between flanges on a central vertical member of the saw head.

When the proper size mounting brackets are welded in proper position on a saw head to make the saw head ready for mounting to a particular manufacturer's tractor, the saw head cannot be mounted to a different manufacturer's tractor. To use the saw head on a different tractor, different size mounting brackets must be used and they must be properly positioned on the saw head. In order to do this, the initial mounting brackets must be cut off and the new mounting brackets must be welded on to the saw head in proper position to fit the particular dimensional requirements of the new tractor's arms.

Furthermore, with the welded-on mounting brackets, the saw head can be mounted to the machine in only one initial position with respect to the ground. In order to optimize performance of the saw, it is desired to keep the saw blade horizontal at all times while cutting. The tilt capability of tractors is limited and is not enough to keep the saw blade horizontal on steeply inclined or declined terrain.

SUMMARY OF THE INVENTION

It is one of the principal objectives of the present invention to provide a mounting assembly to allow a saw head to be quickly and easily mounted to a tractor.

It is another object of the present invention to provide a mounting assembly for a saw head that allows the saw head to be mounted at varying initial positions with respect to the ground so that the saw head can be optimized for use on different types of inclined or declined terrain.

It is still another object of the invention to accomplish the above with a detachable mounting assembly.

It is a further object of the invention to provide a saw head that can use various sized mounting lugs so that the saw head can be used with several different manufacturer's tractors.

It is still further an object of the invention to provide a mounting assembly which allows a saw head to be interchangeably used on different manufacturer's tractors.

According to the present invention, there is provided a mounting assembly for mounting a saw head having a base member and a generally vertical member extending from the base member to a tractor having first and second lift arms. The mounting assembly comprises a mounting lug, a securing mechanism for securing the mounting lug to the saw head, receiving structure for receiving the first lift arm of the tractor, and a securing mechanism for securing the first lift arm to the receiving structure.

BRIEF DESCRIPTION OF DRAWINGS

FIG. 7 is a side view of a saw head and an alternate embodiment of an adjustable mounting assembly.

DETAILED DESCRIPTION OF THE DRAWINGS

Figure 1:
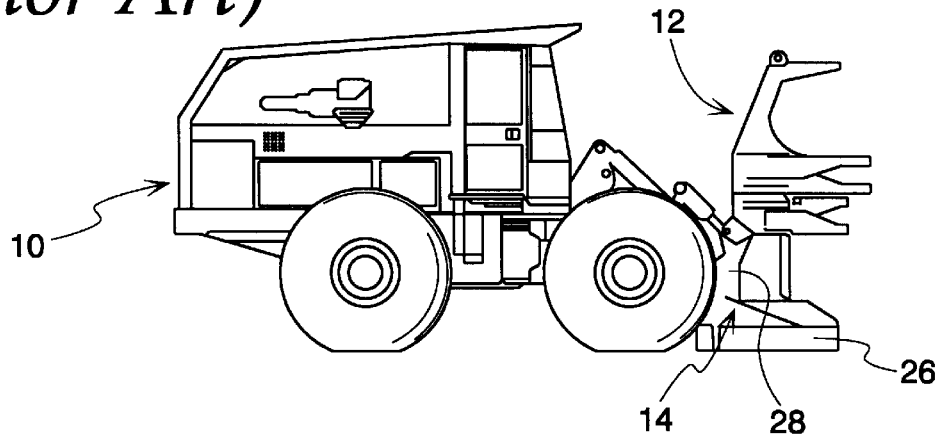
FIG. 1 is a side view of a tractor and a saw head with a prior art mounting bracket assembly attached thereto.

FIG. 1 shows a tractor 10 having a saw head 12 mounted thereto by a prior art mounting bracket assembly 14. The saw head 12 includes a generally circular base member 26 and a vertical member 28 extending upwardly from the base member 26. The base member 26 shields a circular saw blade (not shown) which is mounted inside the base member 26.

Figure 4:
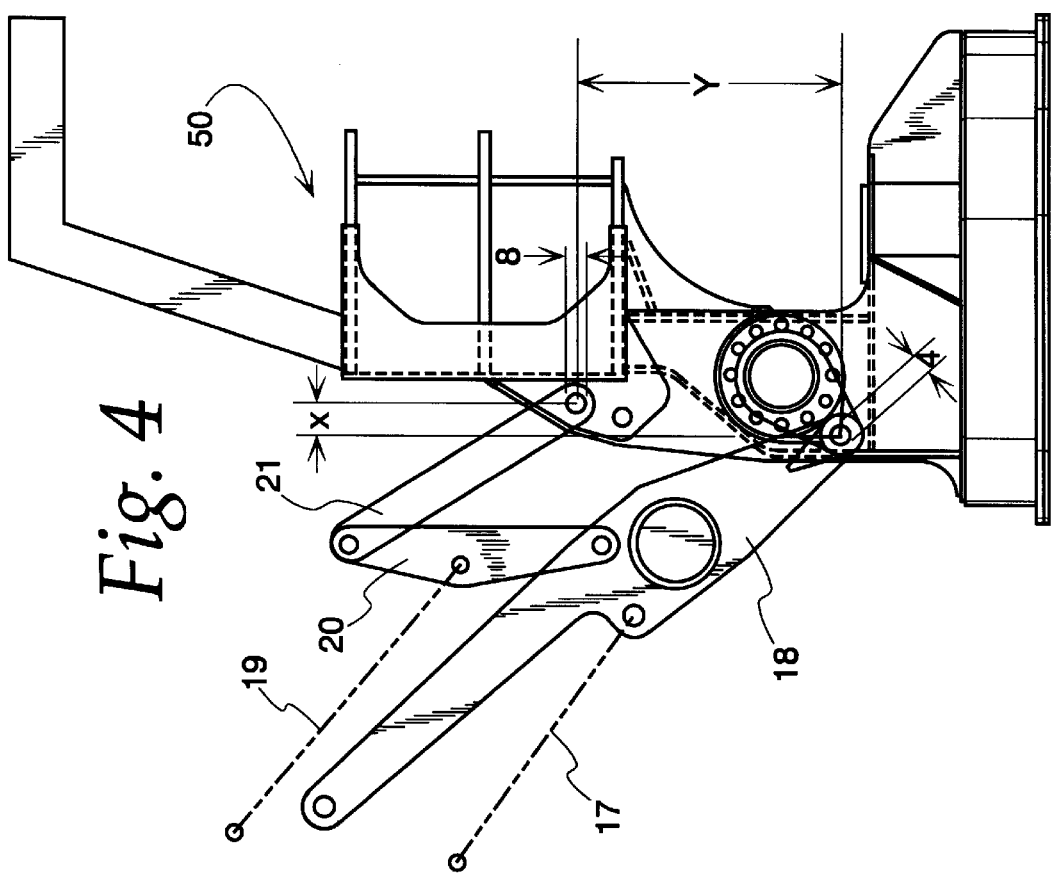
FIG. 4 is a side view of the saw head and adjustable mounting assembly shown in FIG. 3.
Figure 5:
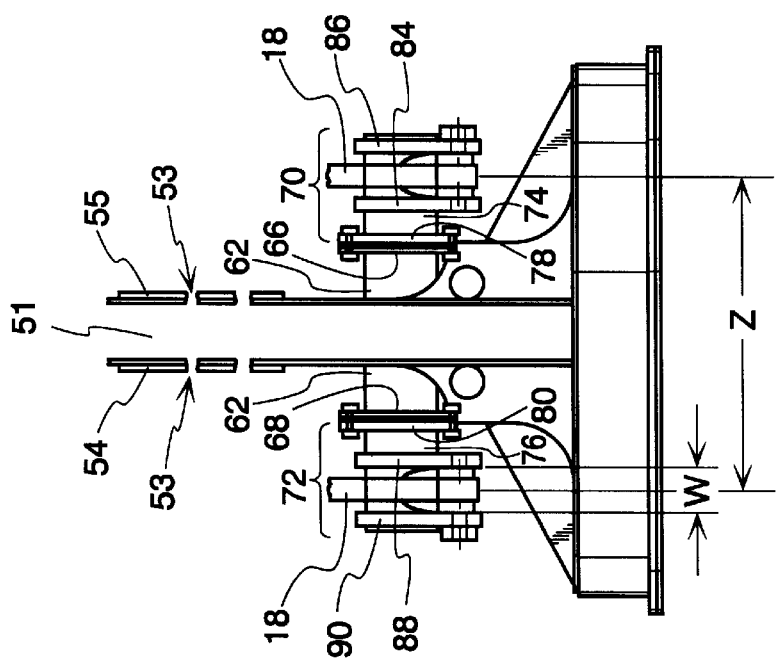
FIG. 5 is a rear view of the saw head and adjustable mounting assembly of FIG. 3.

As shown schematically in FIGS. 4 and 5, attached to the front end of the tractor (not shown) are right and left lift cylinders 17, a set of lift arms 18, and right and left tilt cylinders 19. Right and left link members 20 are attached to the right and left tilt cylinders 19 and to each side of the lift arms 18. A center saw link weldment 21 is also attached to the right and left link members 20. The right and left lift cylinders 17, when operated, raise or lower the saw head 12. The right and left tilt cylinders 19, when operated, tilt the saw head 12 forward or backward. The amount of tilt that can be achieved will vary depending upon the manufacturer of the tractor, but the saw head can be tilted up to approximately 90° forward (away from the operator) from its initial position and up to approximately 15° backward (towards the operator) from its initial position.

Figure 2:
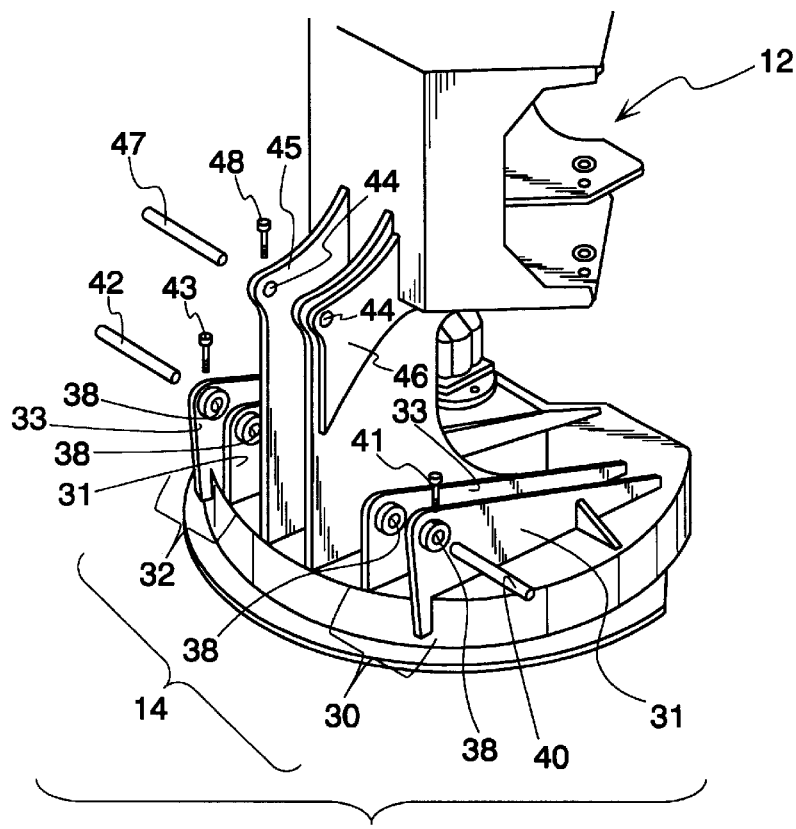
FIG. 2 is a perspective view of the saw head and mounting bracket assembly shown in FIG. 1.

Referring back to FIG. 2, the prior art mounting bracket assembly 14 includes right and left mounting brackets 30 and 32 that are welded onto the base member 26 of the saw head 12. One of the brackets 30 is welded onto the base member 26 on one side of the vertical mounting member 28. The other bracket 32 is welded onto the base member 26 on the other side of the vertical mounting member 28. Each bracket 30 and 32 includes an outside mounting plate 31 and an inside mounting plate 33. Each mounting plate 31 and 33 has a hole 38 therein. The brackets 30 and 32 are welded to the base member 26 so that one of the right or the left lift arms fits between the mounting plates 31 and 33 of the brackets, i.e., the right lift arm 18 fits between plates 31 and 33 of bracket 30 and the left lift arm 18 fits between plates 31 and 33 of bracket 32.

The right lift arm 18 is then secured in bracket 30 by a pin 40 which is inserted through the holes 38 in the plates 31 and 33 and an aligned hole (not shown) in the right lift arm 18 and a lock pin 41. Similarly the left lift arm 18 is pinned in the bracket 32 with pin 42 and lock pin 43.

Two holes 44 are also located on opposing flanges 45 and 46 of the vertical mounting member 28 which provides a mounting area for the center saw link weldment 21 from FIG. 4. The distal end of the center saw link weldment 21 has a hole therein. The center saw link weldment 21 is secured to the vertical mounting member 28 by placing a distal end of the center saw link weldment 21 between the flanges 45, 46 so that the hole in the distal end of the center saw link weldment 21 is aligned with the holes 44 in the flanges 45 and 46. The center saw link weldment 21 is then secured to the vertical mounting member 28 by placing a pin 47 through the aligned holes 44 and securing the pin 47 with a lock pin 48.

Referring now to FIGS. 3–6 a saw head 50 having a new adjustable mounting assembly is shown. The saw head 50 has a vertical mounting member 51 and a circular base member 52 mounted thereto. A saw blade (not shown) is attached beneath the circular base member 52.

The vertical mounting member 51 of the saw head 50 has two opposing flanges 54, 55 with holes 53 therein. The flanges 54, 55 provide a mounting area for center link weldment 21. The center link weldment 21 is connected between the flanges 54, 55 of the vertical mounting member 51 by pinning the center link weldment 21 between the flanges 54 and 55 with a pin 56 and lock pin 57 as described above with respect to the saw head 12.

The saw head 50 also includes a generally tubular mounting member 62 which extends transversely through the flanges 54 and 55.

Figure 3:
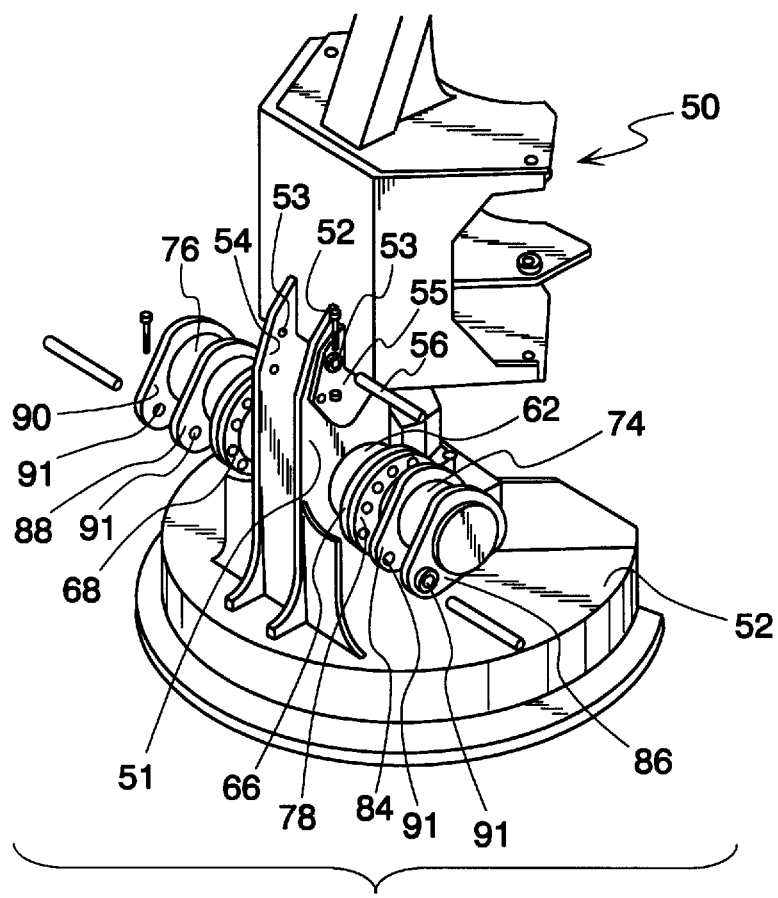
FIG. 3 is a perspective view of a saw head with an adjustable mounting assembly of the present invention.

The tubular mounting member 62 has annular flanges 66 and 68 at the ends thereof. The annular flanges 66 and 68 have several holes therein about the perimeter thereof which form a bolt pattern. As shown in FIGS. 3 and 4, the annular flanges 66 and 68 have twelve (12) equally spaced apart holes around the perimeter and form a circular bolt pattern.

Also shown in FIGS. 3 and 5, the adjustable mounting assembly also includes mounting lugs 70 and 72 that are attached to the annular flanges 66 and 68, respectively. Each mounting lug 70, 72 includes a cylindrical member 74 and 76 and annular flanges 78, 80 that are positioned at one end of each of the cylindrical members 74 and 76. A pair of mounting plates 84, 86 and 88, 90 are positioned at the other end of the cylindrical members 74 and 76, respectively.

Annular flanges 78 and 80 have several holes around the perimeter thereof, forming a matching bolt pattern to the bolt pattern on the annular flanges 66 and 68 of the tubular mounting member 62. As shown, the mounting lugs 70 and 72 are attached to the tubular mounting member 62 by bolts which are passed through each of the holes in the annular flanges 66, 78 and 68, 80 and securing the bolts with nuts.

The lift arm mounting plates 84, 86 and 88, 90 are spaced apart from each other at a certain predetermined distance such that when the mounting lugs 70 and 72 are bolted on to the saw head 50, a particular tractor's left and right lift arms 18 can be properly placed between each pair of plates 84, 86 and 88, 90. Each mounting plate 84, 86, 88 and 90 has a hole 91 therein for receiving a bolt. The lift arms 18 are secured to the plates 84, 86 and 88, 90 by bolting the lift arms 18 between the respective pair of plates 84, 86 and 88, 90 via the holes 91.

The saw head 50 can be easily adapted to be mounted on several different types of tractors by providing several different sizes of mounting lugs 70 and 72 to enable the right and left lift arms 18 of a particular tractor to be received therein.

The position of the lift arms 18 and center saw link weldment 21 of a certain manufacturer's tractor dictates the certain dimensions that the mounting assembly must accommodate.

As shown in FIGS. 4 and 5, the predetermined or critical distances that form the dimensions for mounting a saw head to a particular manufacturer's tractor are shown as distances "W", "X", "Y" and "Z", as well as diameters "A" and "B". All of the distances and diameters are known for a particular manufacturer's tractor. The distances are defined as set forth below.

The distance "W" is the thickness of the distal end of the lift arm where it attaches between the mounting plates 84 and 86 or 88 and 90.

The distance "X" is the horizontal distance between the distal end of the center saw link weldment 21 and the distal end of the right or left lift arms 18 when the saw head 50 is positioned with the base member 26 on a horizontal surface.

The distance "Y" is the vertical distance between the distal end of the center saw link weldment 21 and the distal end of the right or left lift arms 18 when the saw head 50 is positioned with the base member 26 on a horizontal surface.

The distance "Z" is the distance between the centers of the right and left lift arms 18 on the tractor.

The diameter "A" is the diameter of the holes 91 in the plates 84, 86, 88 and 90.

The diameter "B" is the diameter of the holes 53 in flanges 54 and 55.

Mounting lugs that do not fit the dimensions of a particular tractor can be simply unbolted from the tubular mounting member 62 and new, different sized mounting lugs that do fit the tractor can be attached to the tubular mounting member 62.

Figure 6:
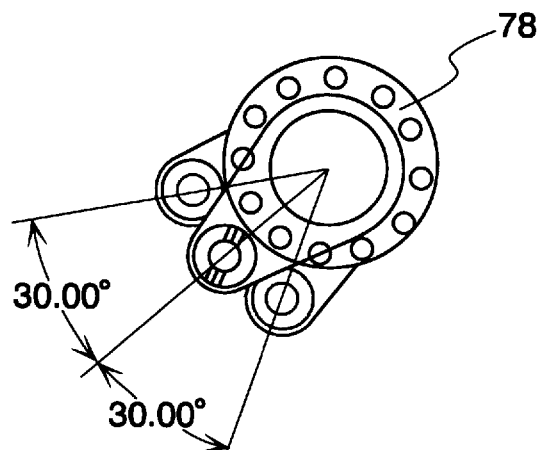
FIG. 6 is a side view of a part of the adjustable mounting assembly shown in FIG. 3.

Another advantage of the present invention is that the mounting lugs 70 and 72 allow the saw head 12 to be mounted to the tractor 10 at different initial positions with respect to the ground. As shown in FIG. 6, the mounting lugs 70, 72 can be rotated to a particular orientation and then attached to the tubular mounting member 62 to provide an initial tilt to the saw head 12. The initial tilt can be an initial tilt backward or an initial tilt forward.

By varying the spacing on the holes in the annular flanges 66 and 68 and the matching holes on the mounting flanges 78 and 80 the amount of initial tilt can be varied. As shown in FIG. 6, there are twelve equally spaced holes that form the bolt pattern. Therefore, by rotating the mounting lugs 70, 72 the initial saw head position can be indexed in 30° increments relative to the mounting lugs in order to provide the proper orientation of the saw head with respect to the ground, which is dictated by the terrain. Note that more or less bolts can be used or the spacing between the bolts can be varied to achieve smaller or larger indexing increments in the initial tilt of the saw head 12.

Referring now to FIG. 7, another embodiment of the mounting assembly is shown. A saw head 100 that is used on the front of a crawler type feller buncher (not shown) is illustrated. A boom 102 and a cylinder 104 are attached to the front of the crawler type feller buncher.

The saw head 100 has a mounting assembly 108 which allows the boom 102 and cylinder 104 to be attached to the saw head 100. The assembly 108 has a mounting lug 109 with left and right mounting lug flanges 110 which are attached to the left and right sides of a vertical member 112 of the saw head 100. The saw head 100 has a tubular member (not shown) with flanges thereon similar to the tubular member 62 of the saw head shown in FIGS. 3–6. The flanges of the tubular member also have a bolt pattern thereon.

The mounting lug flanges 110 have matching bolt patterns and the mounting lug 109 is bolted onto the saw head 100 as described above with reference to FIGS. 3–6.

A slewing ring 111 is attached to a rear end of the mounting lug 109, preferably by bolting the front end of the slewing ring 111 to the mounting lug 109. The front end of the slewing ring 111 has a matching bolt pattern to a bolt pattern on the rear end of the mounting lug 109.

The slewing ring 111 is also attached to a second mounting lug 114, preferably by bolting the rear end of the slewing ring 111 to the second mounting lug 114. The rear end of the slewing ring 111 has a bolt pattern which matches a bolt pattern on the front end of the second mounting lug 114.

The second mounting lug 114 is attached to the boom 102 and cylinder 104 by pinning the lug 114 to the boom 102 and cylinder 104 as shown in FIG. 7.

From the foregoing description, it will be apparent that the saw head assembly of the present invention has a number of advantages, some of which have been described above and others of which are inherent in the saw head assembly of the present invention. Also, it will be understood that modifications can be made to the saw head assembly of the present invention without departing from the teachings of the invention. Accordingly the scope of the invention is only to be limited as necessitated by the accompanying claims.

We claim:

1. A mounting assembly for mounting a saw head having a base member and a generally vertical member extending from the base member to a tractor having first and second lift arms, said mounting assembly comprising:

a mounting lug, including a generally cylindrical member having a first end and a second end, means for securing said mounting lug to the saw head;

said mounting lug having an annular flange on said first end of said generally cylindrical member and a pair of mounting plates at said second end of said generally cylindrical member for receiving one of the lift arms of the tractor; and, means for securing the one of the lift arms to said mounting plates.

2. The mounting assembly of claim 1 wherein said means for securing said mounting lug to the saw head includes a generally horizontal member attachable to the generally vertical member of the saw head, said horizontal member having a first end and a second end, said first end of the horizontal member having an annular flange thereon.

3. The mounting assembly of claim 2 wherein said annular flange of said horizontal member and said annular flange of said mounting lug have matching bolt patterns thereon whereby said mounting lug can be secured to the saw head by bolting said mounting lug to the horizontal member of the saw head.

4. A mounting assembly for mounting a saw head having a base member and a generally vertical member extending from said base member to a tractor having first and second lift arms, said mounting assembly comprising:

a mounting member attachable to the saw head;

a pair of mounting lugs attached to said mounting member;

each of said mounting lugs having means for receiving one of the lift arms of the tractor;

means for securing the lift arms of the tractor to said means for receiving the lift arms, wherein said mounting member attachable to the saw head has flanges at ends thereof and each flange has a bolt pattern therein, and wherein each of said mounting lugs has a flange at an end thereof, said mounting lug flanges having bolt patterns therein which match the bolt patterns in the mounting member flanges to allow the mounting lugs to be bolted onto the mounting member.

5. The mounting assembly of claim 4 wherein said bolt pattern includes equally spaced apart holes forming a generally circular bolt pattern.

* * * * *